(12) United States Patent
Vigholm et al.

(10) Patent No.: US 9,108,670 B2
(45) Date of Patent: Aug. 18, 2015

(54) METHOD FOR CONTROLLING A HYDRAULIC SYSTEM OF A WORKING MACHINE

(75) Inventors: Bo Vigholm, Stora Sundby (SE);
Andreas Ekvall, Hallstahammar (SE);
Kim Heybroek, Eskilstuna (SE)

(73) Assignee: Volvo Construction Equipment AB, Eskilstuna (SE)

( * ) Notice: Subject to any disclaimer, the term of this patent is extended or adjusted under 35 U.S.C. 154(b) by 717 days.

(21) Appl. No.: 13/513,391

(22) PCT Filed: Dec. 2, 2009

(86) PCT No.: PCT/SE2009/000505
§ 371 (c)(1),
(2), (4) Date: Jun. 1, 2012

(87) PCT Pub. No.: WO2011/068441
PCT Pub. Date: Jun. 9, 2011

(65) Prior Publication Data
US 2012/0233993 A1 Sep. 20, 2012

(51) Int. Cl.
*F15B 15/20* (2006.01)
*B62D 5/07* (2006.01)
(Continued)

(52) U.S. Cl.
CPC ................ *B62D 5/075* (2013.01); *E02F 9/225* (2013.01); *E02F 9/2235* (2013.01);
(Continued)

(58) Field of Classification Search
CPC ........ B62D 5/075; E02F 9/2242; E02F 9/225; E02F 9/2292; E02F 9/2296; E02F 9/2235; F15B 11/162; F15B 2211/20523; F15B 2211/20546; F15B 2211/20576; F15B 2211/2654; F15B 2211/2656; F15B 2211/4053

USPC ..................... 60/428, 429, 430, 452, 381, 425
See application file for complete search history.

(56) References Cited

U.S. PATENT DOCUMENTS 6,205,781 B1  3/2001  A'Hearn
7,464,545 B2 * 12/2008  Vigholm ......................... 60/452
(Continued)

FOREIGN PATENT DOCUMENTS

CN  1924367 A  3/2007
EP  1826415 A2  8/2007
(Continued)

OTHER PUBLICATIONS

International Search Report for corresponding International application No. PCT/SE2009/000505.
(Continued)

*Primary Examiner* — Dwayne J White
*Assistant Examiner* — Logan Kraft
(74) *Attorney, Agent, or Firm* — WRB-IP LLP

(57) ABSTRACT

A method is provided for controlling a hydraulic system of a working machine, which hydraulic system includes a first hydraulic machine for providing hydraulic fluid to a first actuator of the working machine, and a second hydraulic machine for providing hydraulic fluid to a second actuator of the working machine and for providing hydraulic fluid to the first actuator. The method includes using a first control mode, and in the first control mode allowing a flow of hydraulic fluid from the second hydraulic machine to the second actuator, wherein the pump pressure of the second hydraulic machine is selected based on the load pressure of the second actuator independently of the load pressure of the first actuator. The method further includes using a second control mode provided that the requested flow to the first actuator exceeds a predetermined threshold value, and in the second control mode allowing a flow of hydraulic fluid from the second hydraulic machine to the first actuator, wherein the pump pressure of the second hydraulic machine is selected based on the highest value of the load pressure of the second actuator and the load pressure of the first actuator.

24 Claims, 3 Drawing Sheets

(51) Int. Cl.
*E02F 9/22* (2006.01)
*F15B 11/16* (2006.01)

(52) U.S. Cl.
CPC ............ *E02F 9/2242* (2013.01); *E02F 9/2292* (2013.01); *E02F 9/2296* (2013.01); *F15B 11/162* (2013.01); *F15B 2211/20523* (2013.01); *F15B 2211/20546* (2013.01); *F15B 2211/20576* (2013.01); *F15B 2211/2654* (2013.01); *F15B 2211/2656* (2013.01); *F15B 2211/4053* (2013.01)

(56) References Cited

U.S. PATENT DOCUMENTS

2005/0210871 A1  9/2005  Lech et al.
2006/0277905 A1* 12/2006  Matsumoto .................... 60/428
2007/0062185 A1  3/2007  Toji et al.

FOREIGN PATENT DOCUMENTS

EP       2065519 A1    6/2009
WO     2006611836 A1   2/2006

OTHER PUBLICATIONS

International Preliminary Report on Patentability for corresponding International application No. PCT/SE2009/000505.

Chinese Official Action (Jun. 5, 2014) for corresponding Chinese Application 200980162692.7.

* cited by examiner

METHOD FOR CONTROLLING A HYDRAULIC SYSTEM OF A WORKING MACHINE

BACKGROUND AND SUMMARY

The invention relates to a method for controlling a hydraulic system of a working machine.

The invention is applicable on working machines within the fields of industrial construction machines, in particular wheel loaders and articulated haulers. Although the invention will be described with respect to a wheel loader, the invention is not restricted to this particular machine, but may also be used in other working machines, such as dump trucks, excavators or other construction equipment.

A working machine is provided with a bucket, container or other type of implement for lifting, carrying and/or transporting a load.

For example, a wheel loader has a load arm unit for raising and lowering the implement, such as a bucket. The load arm unit comprises a number of hydraulic cylinders for movement of the load arm and the implement attached to the load arm. A pair of hydraulic cylinders is arranged for lifting the load arm and a further hydraulic cylinder is arranged on the load arm for tilting the implement.

The wheel loader which usually is frame-steered has also a pair of hydraulic cylinders for turning/steering the wheel loader by pivoting a front part and a rear part of the wheel loader relative to each other.

In addition to the hydraulic cylinders, the hydraulic system of the wheel loader preferably comprise a first pump (working cylinder pump) for providing hydraulic fluid to the hydraulic cylinders of the load arm unit and a second pump (steering cylinder pump) for providing hydraulic fluid to the steering cylinders. In order to optimize the hydraulic system and use the pumps in an effective way the steering cylinder pump can also be used for providing hydraulic fluid to the hydraulic cylinders (working cylinders) of the load arm unit.

Such a hydraulic system usually has a priority valve to ensure that the steering cylinders are supplied with hydraulic fluid by means of the steering pump, and only if there is an excess of hydraulic fluid the steering pump can also supply hydraulic fluid to the working cylinders.

A disadvantage with prior art hydraulic systems using such a priority valve is instability in the steering function, in particular when supplying hydraulic fluid solely to the steering cylinders (and not the working cylinders). It has been shown that the tendency to instability in prior art hydraulic system of the current type is most significant when using the steering cylinder pump for providing hydraulic fluid solely to the steering cylinders, whereas when the steering cylinder pump is used for providing hydraulic fluid also to the working cylinders the hydraulic system works smoother since less adjustment of the displacement of the steering cylinder pump is required.

In such a hydraulic system the steering cylinder pump is controlled to pressurize the hydraulic fluid to a pressure above the load pressure, and the priority valve in turn lowers the pressure to a pressure less than the pump pressure. The flow from the steering cylinder pump, via the priority valve, is directed to a control valve which in turn provides the steering cylinder with hydraulic fluid, and also provides the steering cylinder pump as well as the priority valve with a LS-pressure corresponding to the load pressure of the steering cylinder.

Undesired phase shifts of the pump and the priority valve pressures may arise due to the fact that the displacement of the pump is adjusted. If a very small flow or no flow is required, and thus the displacement of the pump is controlled accordingly, then it takes a certain time to adjust the displacement of the pump so as to increase the flow again when an increased flow is required. This may cause phase shifts of the steering cylinder pump pressure and the priority valve pressure and imply instability in the hydraulic system, i.e. the pump pressure level and the pressure level after the priority valve may start to "oscillate" up and down without finding a stable state.

It is desirable to provide a method defined by way of introduction, which method counteracts instability in the hydraulic system at the same time as the pumps of the hydraulic system can be used efficiently.

By the provision of a method according to an aspect of the present invention having a first control mode allowing a flow of hydraulic fluid from the second hydraulic machine to the second actuator, wherein the pump pressure of the second hydraulic machine is selected based on the load pressure of the second actuator independently of the load pressure of the first actuator, and having a second control mode, which is used provided that the requested flow to the first actuator exceeds a predetermined threshold value, allowing a flow of hydraulic fluid from the second hydraulic machine to the first actuator, wherein the pump pressure of the second hydraulic machine is selected based on the highest value of the load pressure of the second actuator and the load pressure of the first actuator, for example a steering function can be controlled in the first control mode without being negatively affected by a work function which in turn implies increased stability, and the second hydraulic machine can be used in the second control mode to provide additional hydraulic fluid to the work function.

In addition, by selecting the pump pressure of the second hydraulic machine based on the load pressure of the second actuator independently of the load pressure of the first actuator in the first control mode, different pump pressures can be used for the first and second actuators, thereby eliminating energy losses which otherwise would arise when the first and second actuators require different pump pressures.

The wording "predetermined threshold value" comprises automatically and manually selected values. The threshold value can be a variable value in order to achieve various conditions for using the second control mode. The threshold value can be a function of one or more parameters. For example, the threshold value can be selected differently for different operation modes. Preferably, the threshold value is selected on the basis of the flow capacity of the first hydraulic machine.

According to one embodiment of the invention, the hydraulic fluid from the second hydraulic machine is provided to the second actuator and to the first actuator via a priority valve in order to give priority to the second actuator (which can be a steering function) over the first actuator (which can be a work function such as lift or tilt for an implement), and in the first control mode the priority valve is controlled to be substantially fully opened to the second actuator. Hereby, any losses of energy related to a pressure drop over the priority valve can be decreased or eliminated and any instability related to pressure regulation by the priority valve can be counteracted or avoided in the first control mode.

The invention also relates to a computer program and a computer readable medium for performing the steps of the method according to the invention.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
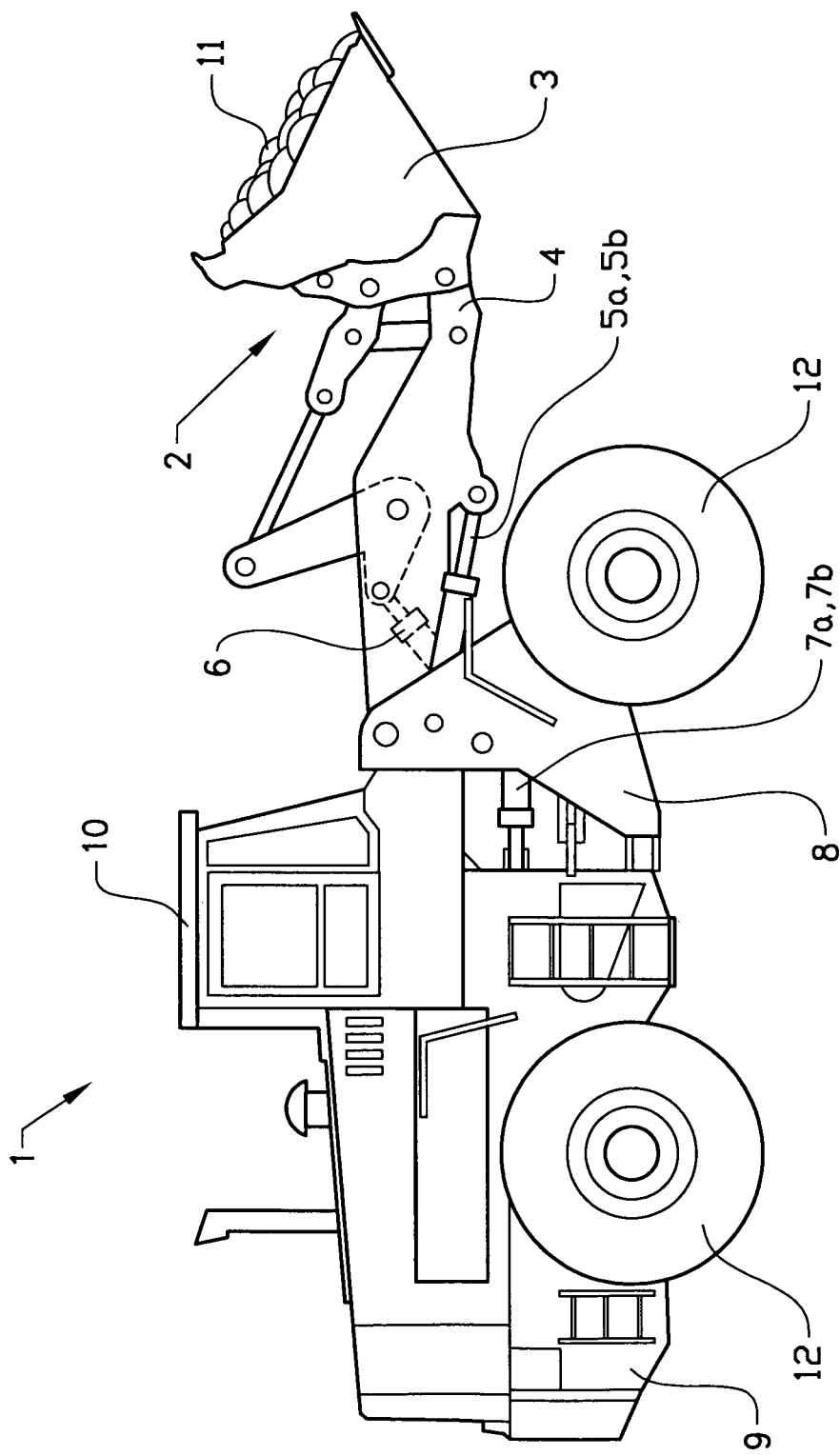
FIG. 1 is a lateral view of a wheel loader.

FIG. 1 shows a working machine 1 in the form of a wheel loader. The wheel loader 1 is to be considered as an example of a working machine having a hydraulic system to which the method according to the invention can be applied.

The wheel loader has a forward machine part 8 and a rear machine part 9. Each of these machine parts comprises a frame and wheels 12 arranged on an axle. The rear machine part 9 comprises a cab 10 for an operator of the wheel loader 1. The machine parts 8, 9 are connected to each other in such a way that they can pivot relative to each other about a vertical axis by means of two hydraulic cylinders (steering cylinders) 7a, 7b which are arranged between the machine parts 8, 9 and attached thereto. The hydraulic cylinders 7a, 7b are thus arranged one on each side of a centre line extending in the longitudinal direction of the working machine 1 in order to turn or steer the wheel loader by means of the hydraulic cylinders. In other words, the wheel loader 1 is a so called frame-steered working machine.

The wheel loader comprises a load arm assembly 2 for handling different loads, such as objects or material. The load arm assembly 2 comprises a lift arm unit 4 and an implement 3 in the shape of a bucket which is mounted on the lift arm unit. In the illustrated example the bucket 3 is filled with material 11. A first end of the load arm unit 4 is pivotally connected to the forward machine part 8 in order to achieve a lift motion of the bucket 3. The bucket 3 is pivotally connected to a second end of the lift arm unit 4 in order to achieve a tilt motion of the bucket. The lift arm unit 4 can be raised and lowered relative to the forward machine part 8 of the vehicle by means of two hydraulic cylinders (lift cylinders) 5a, 5b. Each of the hydraulic cylinders is at a first end thereof coupled to the forward machine part 8 and at the second end thereof to the lift arm unit 4. The bucket 3 can be tilted relative to the lift arm unit 4 by means of a further hydraulic cylinder (tilt cylinder) 6, which at a first end thereof is coupled to the forward machine part 8 and at the second end thereof is coupled to the bucket 3 via a link arm system.

The wheel loader comprises also a drive line (not illustrated) which includes an engine, such as an internal combustion engine, torque converter, gear box etc. The engine can be arranged to supply power to the drive line for driving the wheels 12 and for driving hydraulic machines (pumps) in the hydraulic system by means of a power take off (PTO) which can be arranged at the drive line between the engine and the torque converter.

Figure 2:
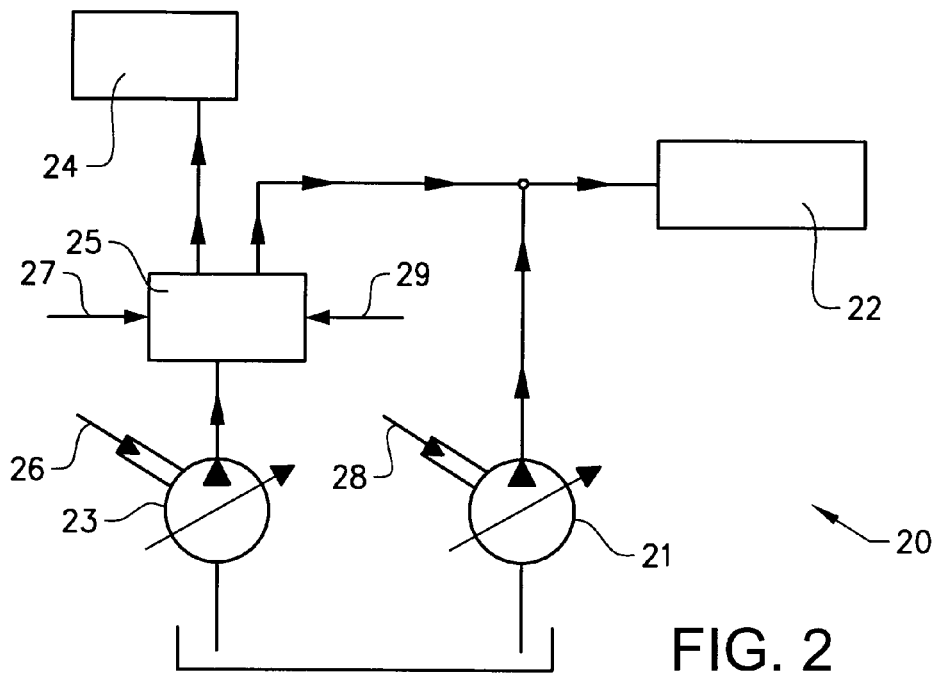
FIG. 2 is a schematic illustration of a hydraulic system for a working machine.

FIG. 2 is a schematic illustration of a hydraulic system 20. The method according to the invention can be applied together with such a hydraulic system. The hydraulic system comprises a first hydraulic machine 21 for providing hydraulic fluid to a first actuator 22, and a second hydraulic machine 23 for providing hydraulic fluid to a second actuator 24. The first and second hydraulic machines are preferably pumps with variable displacements. The second hydraulic machine 23 can deliver hydraulic fluid to the second actuator 24 via some kind of apportionment unit 25, such as a valve arrangement. A priority valve 25 is preferably used to allow hydraulic fluid from the second hydraulic machine 23 to flow also to the first actuator 22. The function of the priority valve 25 is to give priority to the second actuator 24 over the first actuator 22 and allow a flow of hydraulic fluid to the first actuator only if there is a surplus of hydraulic fluid. The first actuator 22 and/or the second actuator 24 may comprise one or more hydraulic cylinders, control valves, hydraulic conduits, etc.

The method according to the invention comprises the step of using a first control mode, wherein hydraulic fluid from the second hydraulic machine 23 is allowed to flow to the second actuator 24. In the first control mode the hydraulic fluid from the second hydraulic machine is allowed to flow solely to the second actuator and thus no hydraulic flow is allowed to flow from the second hydraulic machine 23 to the first actuator 22. In this control mode the pump pressure of the second hydraulic machine 23 is selected based on the load pressure of the second actuator 24 independently of the load pressure of the first actuator 22. The priority valve 25 is preferably fully opened in the first control mode so as to avoid energy losses due to a pressure drop over the priority valve and there is no pressure regulation by means of the priority valve which otherwise could negatively affect the stability of the hydraulic system. In other words, the first actuator 22 and the first hydraulic machine 21 on one hand and the second actuator 24 and the second hydraulic machine 23 on the other hand work as two separate hydraulic systems in the first control mode.

The method further comprises the step of using a second control mode provided that the requested flow to the first actuator 22 exceeds a predetermined threshold value, wherein hydraulic fluid from the second hydraulic machine 23 is allowed to flow to the first actuator 22. In the second control mode the pump pressure of the second hydraulic machine 23 is selected based on the highest value of the load pressure of the second actuator 24 and the load pressure of the first actuator 22. Thereby, the second hydraulic machine 23 is able to provide hydraulic fluid to the first actuator 22 even if the load pressure of the first actuator is higher than the load pressure of the second actuator.

As schematically indicated in FIG. 2, the second hydraulic machine 23 receives a control signal 26 for controlling the pump pressure of the second hydraulic machine. In the first control mode, this second pump control signal 26 is based on the current load pressure in the second actuator 24, whereas in the second control mode this second pump control signal 26 is based on the highest value of the load pressure of the second actuator 24 and the load pressure of the first actuator 22. Furthermore, in the second control mode the priority valve 25 receives a control signal 27 for regulating the priority valve. The priority valve control signal 27 is suitably based on the load pressure of the second actuator 24. The first hydraulic machine 21 correspondingly receives a control signal 28 for controlling the pump pressure of the first hydraulic machine 21, preferably both in the first control mode and in the second control mode. This first pump control signal 28 is based on the load pressure of the first actuator 22.

The above mentioned control signals 26, 27, 28 are preferably so called LS signals representing the load pressure of the current actuator which signals can be hydraulic, signals or electric signals produced by a hydraulic pressure and/or a control unit. In addition, the priority valve 25 preferably receives a further control signal 29, which control signal can be based on the pressure of the hydraulic fluid in a position between the priority valve 25 and the second actuator 24

(which pressure corresponds to the pump pressure of the second hydraulic machine 23).

By using the second control mode only when the requested flow to the first actuator 22 exceeds a predetermined threshold value, the second hydraulic machine 23 can be used to provide an additional flow of hydraulic fluid to the first actuator (provided that the requested flow of hydraulic fluid to the second actuator is already fulfilled), for example when the first hydraulic machine is not able to deliver the requested flow to the first actuator. The predetermined threshold value is preferably selected on the basis of the flow capacity of the first hydraulic machine 21. For example, a threshold value corresponding to a certain percentage of the maximal flow capacity of the first hydraulic machine can be selected. The maximal flow capacity is in turn determined by the current rotation speed and the maximal displacement of the first hydraulic machine 21.

For example, the threshold value can be selected to be equal to or exceed 70% of the maximal flow capacity of the first hydraulic machine, or preferably to be equal to or exceed 90% of the maximal flow capacity of the first hydraulic machine or to be substantially equal to the maximal flow capacity of the first hydraulic machine so as to maintain the first control mode as long as the first hydraulic machine is able to provide the requested flow to the first actuator.

Under certain conditions it may be desired to maintain the first control mode even if the requested flow to the first actuator exceeds the flow capacity of the first hydraulic machine (which is achieved by selecting a threshold value which corresponds to more than 100% of the maximal flow capacity). A suitable upper limit of the threshold value can be for example equal to or less than 150%, and preferably equal to or less than 130% of the maximal flow capacity of the first hydraulic machine.

A threshold value in the lower range is preferably selected to ensure that the second hydraulic machine can be used for providing hydraulic fluid to the first actuator without any preceding hydraulic fluid flow drop. This also implies that the second hydraulic machine can be smoothly connected which in turn has ergonomic advantages. A threshold value in the upper range can be used to prevent unnecessary use of the second hydraulic machine, for example when the operator heavily moves a control lever several times during a short period in order to shake the bucket of the working machine. In such a case it is preferred to prevent the second hydraulic machine from being used, both for economic and functional reasons.

The predetermined threshold value is preferably a variable value in order to achieve different conditions for using the second control mode. In addition to the fact that a threshold value constituting a fixed percentage of the maximal flow capacity of the first hydraulic machine will be dependent on the rotation speed of the first hydraulic machine and thereby vary in accordance with the current rotation speed, different threshold values can be selected for different operating conditions. In other words, the predetermined threshold value can be selected based on the current operation state of the working machine. The threshold value can be automatically or manually selected before or during operation of the working machine.

For example, benefits can be achieved by selection of the threshold value as a function of the power available from the engine at the moment, which engine is arranged to drive the hydraulic system as well as the wheels of the working machine. If the engine works at a low rotation speed and the operator rapidly press the accelerator pedal it is preferred to wait until the engine rotation speed has reached a certain level before switching to the second mode to avoid the engine from being extinguished. The threshold value could also depend on the current altitude (level above the sea) at which the working machine is working, since generally internal combustion engines are weaker at high levels.

For example, different threshold values can be used for operating the working machine in an economy mode or a performance mode. In the economy mode the threshold value is selected to be in the upper range, i.e. a relatively high value, which will keep the system in the first mode most of the time in order to decrease the fuel consumption. In the performance mode the threshold value is selected to be in the lower range, i.e. a relatively low value, since an increased use of the second hydraulic machine will result in increased flow utilization. Herby, the performance of the hydraulic system can be increased.

In the same way as the control mode is shifted from the first control mode to the second control mode when the requested flow to the first actuator increases from a level below the predetermined threshold value to a level above the threshold value, a change from the second control mode to the first control mode will preferably take place when the requested flow to the first actuator decreases from a level above the predetermined threshold value to a level below the threshold value.

Furthermore, a first predetermined threshold value can be selected to control a change from the first control mode to the second control mode, and a second predetermined threshold value can be selected to control a change from the second control mode to the first control mode, wherein the first and second predetermined threshold values can be different from each other. If the first and second predetermined threshold values are different from each other the result will be a hysteresis effect. By the provision of a higher threshold value for switching from the first mode to the second mode, and a lower value for switching from the second mode to the first mode the system will be more stable. Otherwise there is a risk that the system will switch repeatedly when the system works in a state close to the threshold value.

The requested flow to the first actuator 22 can be calculated in various ways. For example, if the first actuator 22 is controlled by a control current which is sent to a control valve where the system is servo-controlled, the size of the control current can be a measure of the requested flow.

Alternatively, an indirect measure of the requested flow to the first actuator can be obtained by measuring the current displacement of the first hydraulic machine 21. By means of position sensors the percentage of the maximal displacement of the first hydraulic machine at the current rotation speed can be measured. When the displacement of the first hydraulic machine is increased to the maximal displacement or close to the maximal displacement it is assumed that the requested flow will exceed the capacity of the first hydraulic machine and the system is controlled to switch from the first mode to the second mode.

Figure 3:
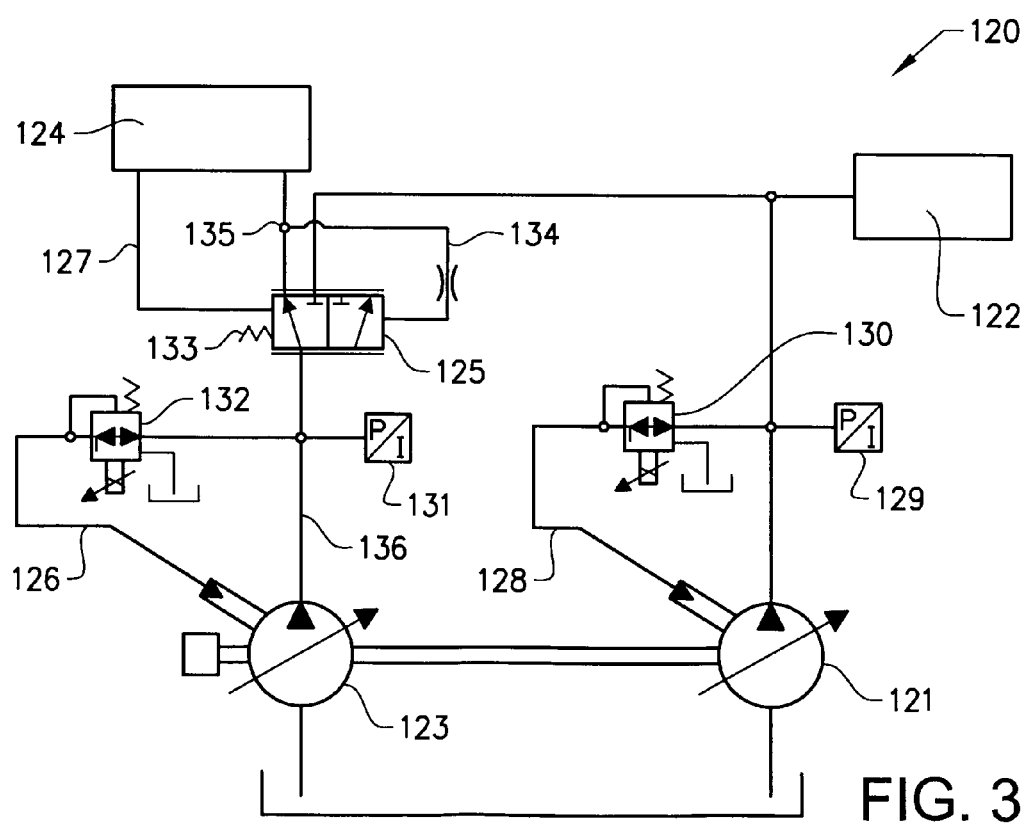
FIG. 3 is a further hydraulic system for a working machine.

FIG. 3 shows a further example of a hydraulic system 120 designed to be controlled by the method according to the invention. The first actuator 122 is arranged to obtain a work function such as the lift function and/or tilt function of a working machine, and the second actuator 124 is arranged to obtain a steering function of the working machine 1 (illustrated in FIG. 1). The first hydraulic machine 121 is a pump with variable displacement which pump is connected to the first actuator 122 for providing hydraulic fluid to one or more hydraulic cylinders (working cylinders) of the first actuator. The second hydraulic machine 123 is a pump with variable displacement for providing hydraulic fluid to one or more hydraulic cylinders (steering cylinders) of the second actuator 124 and/or to the working cylinders of the first actuator 122. The steering cylinder pump 123 is connected to the priority valve 125 and the priority valve is connected to the second actuator 124 and to the first actuator 122.

The control signals 126, 128 to the steering cylinder pump and the working cylinder pump are so called "electric" LS signals. A first pressure sensor 129 is arranged to measure the working cylinder pump pressure. A first electrically controlled valve 130 is controlled by means of a control unit (not shown) to create a hydraulic control signal 128 to the working cylinder pump 121. The electric signal to the first electrically control valve 130 is based on the load pressure of the first actuator 122.

A second pressure sensor 131 is arranged to measure the steering cylinder pump pressure. A second electrically controlled valve 132 is controlled by means of the control unit to create a hydraulic control signal 126 to the steering cylinder pump 123. In the first control mode, the electric signal to the second electrically controlled valve 32 is based on the load pressure of the second actuator 124. In the second control mode, the electric signal to the second electrically controlled valve 132 is based on the highest value of the load pressure of the second actuator 124 and the load pressure of the first actuator 122.

The control signal 127 to the priority valve 125 is a hydraulic LS signal from the second actuator 124 based on the load pressure of the second actuator. The hydraulic LS signal acts on one side (left side) of the flow control element of the priority valve. At this side a spring 133 is arranged which acts in the same direction as the hydraulic LS signal 127. In addition, there is also a conduit 134 connecting a position situated between the priority valve 125 and the second actuator 124 with the other side (right side) of the priority valve 125, which implies that the pressure present downstream the priority valve, i.e. between the priority valve 125 and the second actuator 124, creates a force on the right side of the flow control element in the opposite direction to the spring force of the spring 133.

The second actuator 124 usually comprises a control valve (not illustrated) for controlling the flow of hydraulic fluid from the priority valve 125 to the steering cylinders (not illustrated) of the actuator. One function of the priority valve is to control the pressure drop over the control valve used for the steering function. The pressure drop over the control valve is substantially determined by the characteristics of the spring 133 mentioned above. If the force on the right side of the priority valve 125 becomes higher than the force 1 on the left side (spring force plus the force from the hydraulic LS signal 127), the flow control element will start to close the flow to the steering cylinders and open the flow to the working cylinders (not illustrated) of the first actuator. If the pressure is further increased, the change of the flow control element position is then proportional to the change of pressure since the spring force is proportional to the compression of the spring 133. In other words;

$$P\_STEER = LS\_STEER + P\_SPRING$$

where P_STEER 135 is the pressure before the control valve and LS_STEER 127 is the pressure after the control valve.

Since the LS pressure is equal to the pressure in the steering cylinder downstream the control valve, the pressure drop over the control valve is substantially the pressure component P_SPRING of the spring 133.

The steering cylinder pump 123 works in a similar way. The pump is subjected to a LS pressure 126 and provides a pump pressure 136 which is higher than the LS pressure.

$$P\ PUMP = LS\ PUMP + \Delta P\ PUMP$$

In order to fully open the priority valve to the working cylinders, the pump pressure has to be higher than the maximal pressure P_STEER_MAX present in a position 135 between the priority valve and the control valve.

$$P\_PUMP > P\_STEER\_MAX;$$
$$P\_STEER\_MAX = LS\_STEER + P\_SPRING\_MAX$$

According to one embodiment example of the invention the first control mode is achieved by keeping the pump pressure P_PUMP of the steering cylinder pump 123 lower than the sum of the load pressure LS_STEER of the steering cylinder 124 and a pressure component P_SPRING_MIN caused by a minimum spring force of the priority valve spring 133. Furthermore, the second control mode is achieved by keeping the pump pressure of the second hydraulic machine higher than the sum of the load pressure LS_STEER of the steering cylinder and a pressure component P_SPRING_MAX caused by a maximum spring force of the priority valve spring 133.

As an example, suppose the following numerals:
P_SPRING_MIN=15 bar
P_SPRING_MAX=20 bar
ΔP_PUMP=10 bar In case the pump 123 receives same LS signal as the priority valve 125, the priority valve 125 will be open to the steering cylinders 124 and fully closed to the working cylinders 122 of the first actuator. The LS signal to the pump 123 can however be selected by an electric signal from the control unit to said second electrically controlled valve 132 and thereby the pump pressure can be increased, and thus the priority valve 125 can be controlled accordingly.

Suppose that LS_STEER is 100 bar. This implies that P_STEER 135 has to reach 115 bar before the priority valve flow control element starts to move and 120 bar in order to displace the flow control element the maximal distance and fully open the valve to the working cylinders 122. If LS_PUMP is 1 lobar the pump pressure P_PUMP will be 120 bar. This pressure will also be present after the priority valve 125 and the priority valve will be closed to the steering cylinders 124 and fully opened to the working cylinders 122. If a flow is requested from the steering cylinders 124 the priority valve will regulate so as to prioritize maintaining the requisite pressure to the steering cylinders 124 and thereafter open to allow a flow to the working cylinders 122.

Accordingly, the first control mode can be achieved by keeping the pump pressure of the steering cylinder pump 123 lower than 1 15 bar (P_PUMP<LS_STEER+P_SPRING_MIN).

The second control mode can be achieved by keeping the pump pressure higher than 120 bar (P_PUMP>LS_STEER+P_SPRING_MAX).

If the load pressure of the working cylinders 122 is higher than the load pressure of the steering cylinders 124, the steering cylinder pump pressure 136 is however selected based on the load pressure of the working cylinders 122. In other words, if LS_WORK>LS_STEER+P_SPRING_MAX then P_PUMP is selected to be LS_WORK+ΔP_PUMP.

Figure 4:
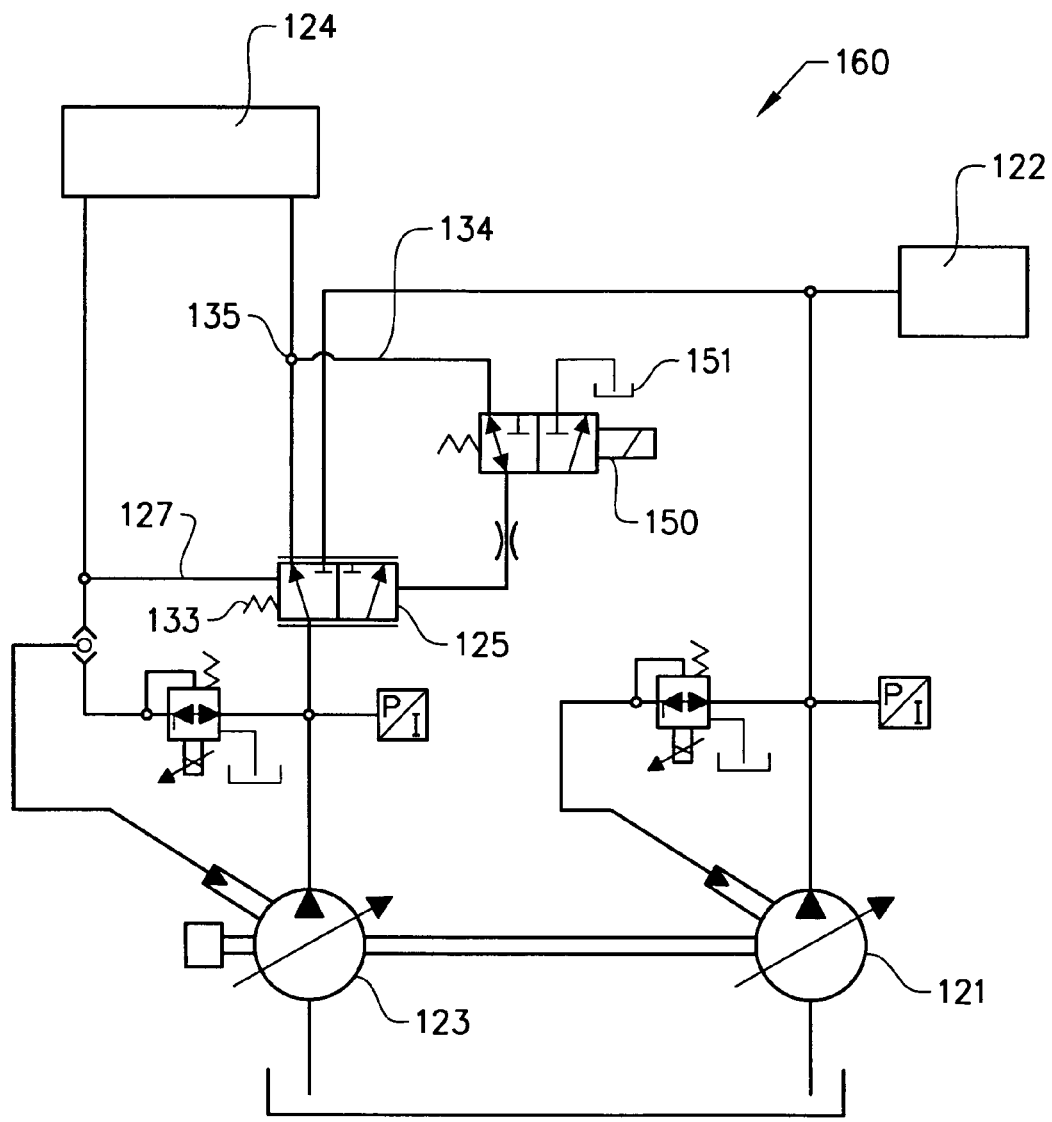
FIG. 4 is a further hydraulic system for a working machine.

FIG. 4 shows a further variant of a hydraulic system 160 which can be used together with the method according to the invention.

With reference to FIG. 4 mainly the differences as compared to the hydraulic system in FIG. 3 will be described.

With respect to similar or same functions/components reference is also made to previous figures and description, and the same reference numerals will be used.

In the hydraulic system in FIG. 4 an electrically controlled valve 150 is arranged in the conduit 134 extending from a position 135 between the priority valve 125 and the second actuator 124 to the right side of the priority valve. This valve can be used to control the selection of the first mode and second mode according the invented method.

The pressure downstream the priority valve, i.e. between the priority valve and the second actuator, which pressure corresponds to the supply pressure to steering, can create a force on the right side of the flow control element of the priority valve 125. This force can be manipulated or eliminated by the electrically controlled valve 150.

The priority valve 125 receives one hydraulic LS signal 127 from the second actuator 124 based on the load pressure of the second actuator. This hydraulic signal acts on the left side of the flow control element of the priority valve 125. At this side a spring 133 is also arranged which acts in the same direction as the hydraulic LS signal 27.

When the electrically controlled valve 150 is activated, i.e. an electric current from a control unit is sent to the valve, the right side of the priority valve 125 is connected to tank 151. Thus, there is an effective force acting from left to right on the flow control element of the priority valve 125. This implies that the priority valve 125 is closed against the working cylinders 122 and fully opened to the steering cylinders 124. In other words, the system is in the first mode.

In absence of an electric current from the control unit to the electric control valve 150, hydraulic fluid is allowed to flow through the electric controlled valve and act on the right side of the flow control element of the priority valve 150. If the force on the right side of the priority valve is less than the force created by the spring and the load pressure on the left side of the priority valve, the priority valve will still be closed against the working cylinders and fully opened to the steering cylinders. If on the other hand the force on the right side exceeds the force created by the spring and the load pressure on the left side of the priority valve, the priority valve will start to open to the working cylinders 122. Then, the system is in the second mode.

It is to be understood that the present invention is not limited to the embodiments described above and illustrated in the drawings; rather, the skilled person will recognize that many changes and modifications may be made within the scope of the appended claims.

The invention claimed is:

1. A method for controlling a hydraulic system of a working machine, the hydraulic system comprising a first hydraulic machine for providing hydraulic fluid to a first actuator of the working machine, and a second hydraulic machine for providing hydraulic fluid to a second actuator of the working machine and for providing hydraulic fluid to the first actuator, the method comprising:
   using a first control mode, and in the first control mode allowing a flow of hydraulic fluid from the second hydraulic machine solely to the second actuator and thus no hydraulic flow is allowed from the second hydraulic machine to the first actuator, the pump pressure of the second hydraulic machine being selected based on the load pressure of the second actuator independently of the load pressure of the first actuator, and
   using a second control mode provided that the requested flow to the first actuator exceeds a predetermined threshold value, and in the second control mode allowing a flow of hydraulic fluid from the second hydraulic machine to the first actuator, the pump pressure of the second hydraulic machine being selected based on the highest value of the load pressure of the second actuator and the load pressure of the first actuator.

2. A method according to claim 1, wherein the predetermined threshold value is selected on the basis of the flow capacity of the first hydraulic machine.

3. A method according to claim 1, wherein the predetermined threshold value is a variable value in order to achieve various conditions for using the second control mode.

4. A method according to claim 1, wherein the predetermined threshold value is selected to be equal to or exceed 70% of the maximal flow capacity of the first hydraulic machine.

5. A method according to claim 4, wherein the predetermined threshold value is selected to be equal to or less than 150% of the maximal flow capacity of the first hydraulic machine.

6. A method according to claim 4, wherein the predetermined threshold value is selected to be equal to or less than 130% of the maximal flow capacity of the first hydraulic machine.

7. A method according to claim 1, wherein the predetermined threshold value is selected to be equal to or exceed 90% of the maximal flow capacity of the first hydraulic machine.

8. A method according to claim 1, wherein the predetermined threshold value is selected to be substantially equal to the maximal flow capacity of the first hydraulic machine.

9. A method according to claim 1, wherein the hydraulic fluid from the second hydraulic machine is provided to the second actuator and to the first actuator via a priority valve in order to give priority to the second actuator over the first actuator.

10. A method according to claim 9, wherein the priority valve having a spring acting to bring the priority valve to a state where the hydraulic fluid is allowed to flow to the second actuator in order to give priority to the second actuator over the first actuator.

11. A method according to claim 10, wherein the first control mode is achieved by keeping the pump pressure of the second hydraulic machine lower than the sum of the load pressure of the second actuator and a pressure component caused by a spring force of the priority valve spring.

12. A method according to claim 11, wherein the first control mode is achieved by keeping the pump pressure of the second hydraulic machine lower than the sum of the load pressure of the second actuator and a pressure component caused by a minimum spring force of the priority valve spring.

13. A method according to claim 10, wherein the second control mode is achieved by keeping the pump pressure of the second hydraulic machine higher than the sum of the load pressure of the second actuator and a pressure component caused by a spring force of the priority valve spring.

14. A method according to claim 13, wherein the spring force is selected in a range between a minimum spring force and a maximum spring force of the priority valve spring.

15. A method according to claim 13, wherein the second control mode is achieved by keeping the pump pressure of the second hydraulic machine higher than the sum of the load pressure of the second actuator and a pressure component caused by a maximum spring force of the priority valve spring.

16. A method according to claim 9, wherein in the first control mode the priority valve is controlled to be substantially fully opened to the second actuator.

17. A method according to claim 1, wherein the predetermined threshold value Is selected based on the current operation state of the working machine.

18. A method according to claim 1, wherein the predetermined threshold value is selected for operating the working machine in an economy mode or a performance mode.

19. A method according to claim 1, wherein the predetermined threshold value is varied during operation of the working machine.

20. A method according to claim 1, wherein a first the predetermined threshold value is selected to control a change from the first control mode to the second control mode, and a second the predetermined threshold value is selected to control a change from the second control mode to the first control mode, the first and second predetermined threshold values being different from each other.

21. A method according to claim 1, wherein the first actuator is arranged for operating an implement of the working machine.

22. A method according to claim 1, wherein the second actuator is arranged for operating a steering function of the working machine.

23. A computer comprising program code for performing the steps of claim 1.

24. A nontransitory computer readable medium comprising a computer program for performing the steps of claim 1.

* * * * *